April 5, 1949.  R. G. LE TOURNEAU  2,466,449
TIRE AND RIM ASSEMBLY

Filed Nov. 24, 1945  2 Sheets-Sheet 1

INVENTOR.
R. G. LeTourneau
BY
ATTYS

April 5, 1949.   R. G. LE TOURNEAU   2,466,449
TIRE AND RIM ASSEMBLY

Filed Nov. 24, 1945   2 Sheets-Sheet 2

INVENTOR.
R. G. LeTourneau
BY
ATTYS

Patented Apr. 5, 1949

2,466,449

UNITED STATES PATENT OFFICE 2,466,449

TIRE AND RIM ASSEMBLY

Robert G. Le Tourneau, Peoria, Ill., assignor to R. G. Le Tourneau, Inc., Stockton, Calif., a corporation of California Application November 24, 1945, Serial No. 630,631

1 Claim. (Cl. 152—410)

This invention is directed in general to an improved tire and wheel rim assembly.

One feature of this invention is to provide a novel tire and wheel rim assembly especially designed for large pneumatic tires such as are used on heavy-duty construction and earth moving equipment wherein it is desirable to run the tires at relatively low pressures in order to increase the flotation obtained therefrom; said assembly being operative to prevent slippage of the tire on the rim when said tire is used at such a low pressure.

An additional feature of the present invention is the provision, in a tire and wheel rim assembly as above, of a tire having beads which are relatively wide transversely of the tire, with the bottom surfaces of said beads converging inwardly from their outer edges; the rim converging inwardly from its outer edges to its center line for matching frictional engagement by said bottom surfaces of said tire beads, whereby at low tire pressures the tire beads tend to separate and maintain positive frictional and non-slipping engagement with the bead flanges on opposite sides of said rim.

Another object of this invention is to provide a tire and wheel rim assembly wherein the rim is comprised of initially separate, circumferential rim halves or sections, one section being fixed to the wheel and the other section being detachably locked in complementary relation to said one section by a novel locking unit; the advantage of the separate rim sections residing in ease of assembly of the rim with the heavy-duty tire with which said rim is adapted to be used.

A further object of the invention is to provide a simple and inexpensive tire and rim assembly, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views.

Figure 1:
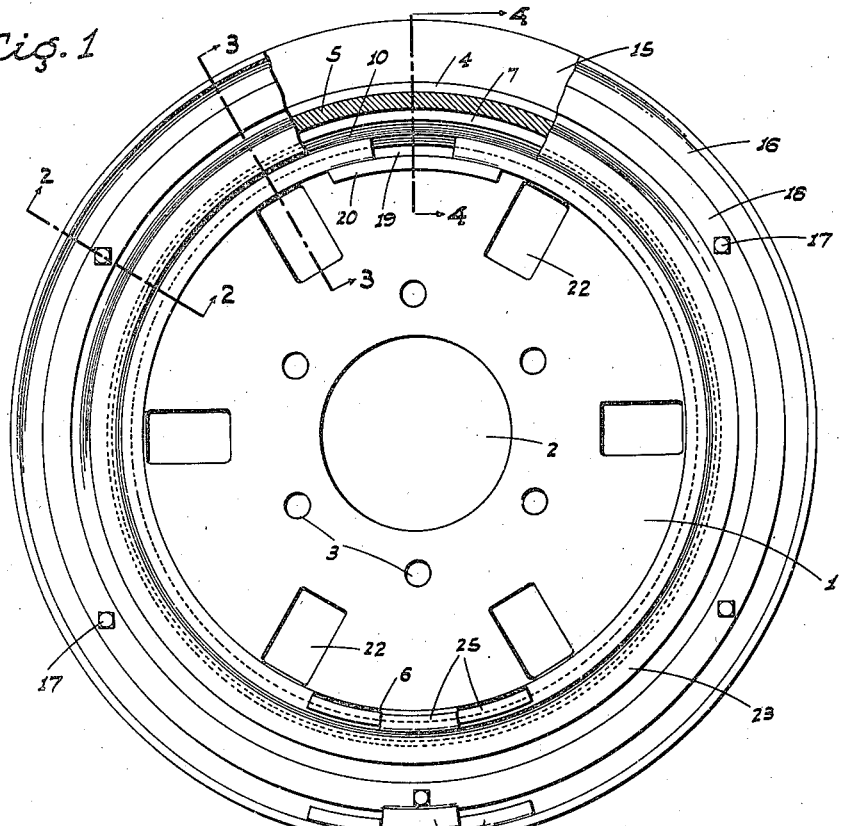
Figure 1 is a side elevation of the rim assembly without a tire thereon.

Referring now more particularly to the characters of reference on the drawings, the numeral 1 indicates a steel disc wheel formed with a center, wheel hub receiving hole 2, with a row of circumferentially spaced bolt holes 3 thereabout for the reception of the bolts which secure the wheel to the wheel hub.

At the periphery the wheel 1 is formed with a sectional rim which comprises a pair of separate circumferential rim halves or sections, indicated at 4 and 5. The rim section 4 is fixed at its inner edge portion in connection with the periphery of the disc wheel 1.

The other rim section 5 remains separate from the rim section 4 and is adapted to be held in complementary relation thereto by means of the following arrangement:

An annular locking flange 6 is fixed on the wheel 1 adjacent but short of its periphery and projects laterally from said wheel inwardly of the rim section 5 in adjacent but spaced concentric relation. Directly outwardly of the annular locking flange 6 the rim section 5 is provided with a fixed annular locking shoulder 7 which projects toward and normally into engagement with the annular locking flange 6. The annular locking flange 6 is formed, on its outer face, with an annular V-shaped channel 8, and the annular locking shoulder 7 includes a circumferential abutment face 9 disposed in parallel relation to the axially outermost face of the V-channel 8.

A split locking ring 10, which is square in cross section, normally seats in the V-channel 8 and is engaged on its adjacent top side by the abutment face 9 of the annular locking shoulder 7, whereby to prevent laterally outward movement of said shoulder relative to the flange 6 so that the rim section 5 cannot then separate, axially of the wheel, from the fixed rim section 4. In this locked position, the locking ring 10 is held against escape from the V-channel 8 by an overhanging circumferential lip 11 on the annular locking shoulder 7.

Figure 2:
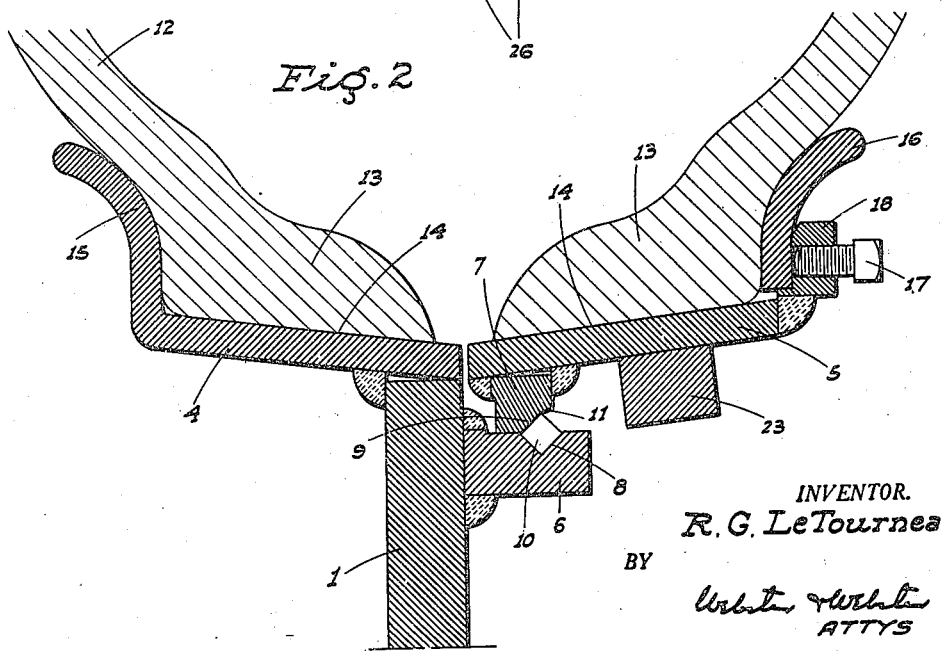
Figure 2 is an enlarged cross section on line 2—2 of Fig. 1 showing the tire and rim assembly with the sectional rim in locked position.

When the sectional rim is assembled and locked together, as above, the tire 12 seats in said rim in the manner shown in Fig. 2. The tire 12 is formed with opposed, relatively wide tire beads 13; the bottom surfaces 14 of which converge radially inwardly from their axially outer edges, and the corresponding rim sections 4 and 5 converge radially inwardly for matching frictional engagement with said beads. The beads are limited in their lateral outward movement on the rim sections 4 and 5 by bead flanges, indicated at 15 and 16, respectively.

By reason of the convergence of the bottom surfaces 14 of the tire beads 13, and the matching convergence of the rim sections 4 and 5, the tire beads 13 tend to separate relative to each other and maintain positive frictional contact with the bead flanges 15 and 16, even though the tire may be running at a relatively low pressure. As a consequence there is no slippage between the tire and the rim.

The bead flange 15 is an integral part of the rim section 4, but the bead flange 16 is initially separate from and is movable axially of the rim toward the center of the latter by means of adjustment screws 17 threaded through an annular shoulder 18 fixed on the outer edge of the rim section 5. The movable bead flange 16 normally abuts against the inner side of the annular shoulder 18, but when it is desired to remove a tire from the rim the screws 17 are run in until said bead flange 16 is forced inwardly so as to break or free the corresponding bead 13 from the rim section 5.

After the corresponding tire bead 13 has been freed from the rim section 5 the latter is unlocked from the wheel as follows:

At one point in the circumference thereof the annular locking flange 6 is formed with a relatively short gap 19 therein, and a cross bar 20 is fixed in connection with adjacent end portions of said flange 6 on the inside and extends across said gap. The cross bar 20 thus forms a fulcrum disposed in a plane some distance radially inwardly of the split locking ring 10.

Figure 3:
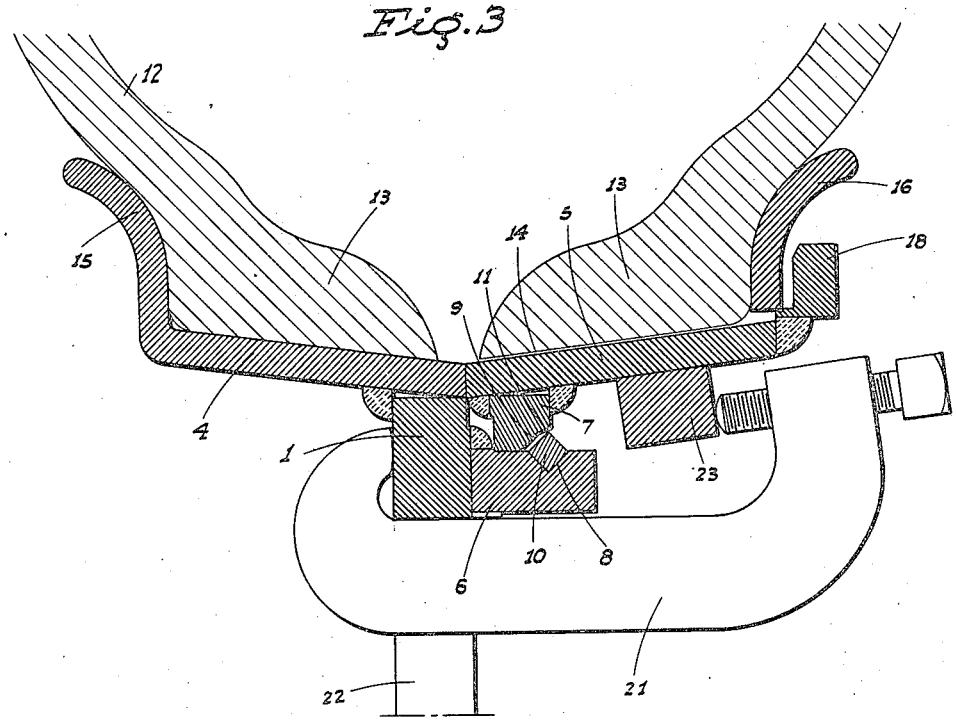
Figure 3 is an enlarged cross section on line 3—3 of Fig. 1 showing the position of one of the C-clamps as used in connection with the sectional rim to assemble or disassemble the same.
Figure 4:
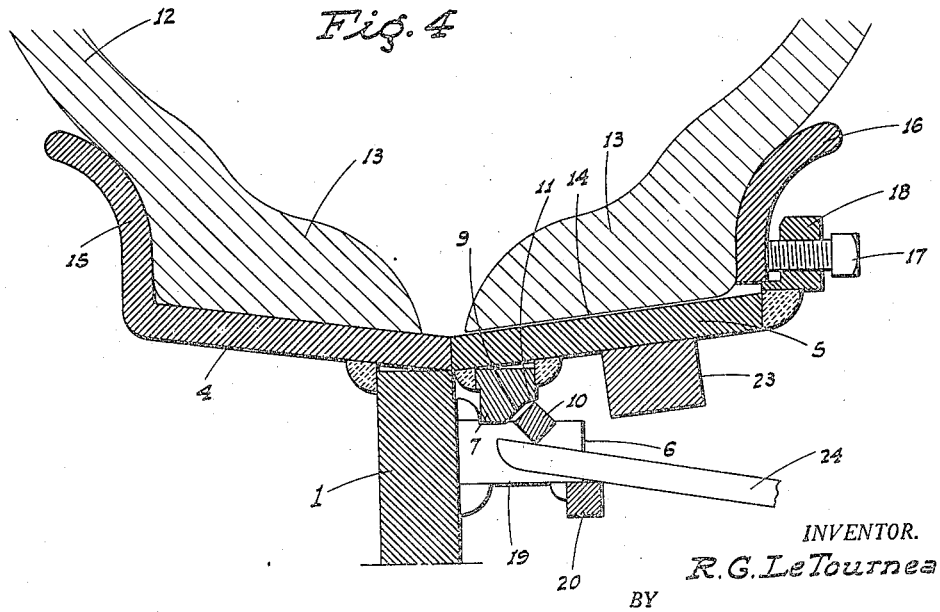
Figure 4 is an enlarged cross section on line 4—4 of Fig. 1 showing the manner in which the locking ring is unseated or removed from the assembly when the rim sections are in the position shown in Fig. 3.

A plurality of C-clamps 21 are engaged through circumferentially spaced ports 22 formed in the wheel 1 radially inwardly of the locking flange 6, said C-clamps engaging between the wheel 1 and a fixed clamping ring 23 on the bottom of the rim section 5 intermediate its edges. When the C-clamps 21 are tightened, the rim section 5, which is normally somewhat spaced from the rim section 4, is moved inwardly into engagement therewith in the manner shown in Fig. 3. This retracts the annular locking shoulder 7, together with the overhanging lip 11, from the split locking ring 10.

A pry bar 24 is then engaged over the cross bar or fulcrum 20 and beneath the split locking ring 10, so that manipulation of said pry bar 24 snaps said ring out of the V-channel 8. With the ring 10 thus removed, the rim section 5 is free of the rim section 4 and can be withdrawn from the tire 12. After withdrawal of the rim section 5, the tire can then be freed and withdrawn from the rim section 4.

To reassemble the rim with a tire thereon the above described procedure is merely reversed.

The tire and wheel rim assembly as above described is very useful and practical for large industrial and heavy-duty tires, such as are used on construction and earth moving equipment, and which tires are very difficult to mount on conventional rims. Not only does the described rim structure provide for easy mounting or dismounting of tires but, as heretofore explained, permits the tires to be run at low pressure, with increased flotation, without the tire slipping on the rim. This latter feature is extremely desirable.

In order to prevent possible relative rotation of rim sections 4 and 5, they are provided with cooperating sets of driving lugs 25. Similar cooperating sets of driving lugs 26 are provided between rim section 5 and bead flange 16 to prevent relative rotative movement thereof without interfering with axial shifting movement.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

In combination with a wheel of the disc type, a sectional rim comprising two complementary half sections, one rim section being fixed rigidly to the wheel and its inner edge terminating adjacent one face of the wheel, such one rim section being adapted to support one bead of a tire in its entirety, an annular locking flange fixed to said one face of the wheel adjacent to but short of the periphery of the wheel, said locking flange being provided with an annular groove in its outer circumference, the other rim section being adapted to support the other bead of a tire in its entirety, an annular locking shoulder on the under face of said other rim section adjacent its inner edge, said locking shoulder overhanging the locking flange on the wheel and resting thereon, and a locking ring adapted to be seated in said groove and project therefrom in engagement with said locking shoulder.

ROBERT G. LE TOURNEAU.

REFERENCES CITED

The following references are of record in the file of this patent:

UNITED STATES PATENTS

| Number | Name | Date |
| --- | --- | --- |
| 779,730 | Neary | Jan. 10, 1905 |
| 1,795,472 | Budd | Mar. 10, 1931 |
| 1,836,922 | Helvern | Dec. 15, 1931 |
| 1,964,618 | Bourdon | June 26, 1934 |
| 2,173,195 | Beckman | Sept. 19, 1939 |
| 2,219,156 | Yankee | Oct. 22, 1940 |

FOREIGN PATENTS

| Number | Country | Date |
| --- | --- | --- |
| 461,643 | Great Britain | 1937 |